Jan. 13, 1959 S. W. ALLISON 2,868,886

TOLL TELEPHONE CIRCUITS

Filed Dec. 2, 1954 5 Sheets-Sheet 1

INVENTOR
S. W. ALLISON
BY C. Mattice
ATTORNEY

Jan. 13, 1959 S. W. ALLISON 2,868,886

TOLL TELEPHONE CIRCUITS

Filed Dec. 2, 1954 5 Sheets-Sheet 2

INVENTOR
BY S.W. ALLISON
C. Mathiel
ATTORNEY

INVENTOR
S. W. ALLISON
BY C. Mattice
ATTORNEY

Jan. 13, 1959 S. W. ALLISON 2,868,886

TOLL TELEPHONE CIRCUITS

Filed Dec. 2, 1954 5 Sheets-Sheet 4

INVENTOR
S. W. ALLISON
BY C. Mattice
ATTORNEY

Jan. 13, 1959 S. W. ALLISON 2,868,886

TOLL TELEPHONE CIRCUITS

Filed Dec. 2, 1954 5 Sheets-Sheet 5

INVENTOR
S. W. ALLISON
C. Mathie
ATTORNEY

United States Patent Office 2,868,886

Patented Jan. 13, 1959

2,868,886

TOLL TELEPHONE CIRCUITS

Sewell W. Allison, West Orange, N. J., assignor to Bell Telephone Laboratories, Incorporated, New York, N. Y., a corporation of New York Application December 2, 1954, Serial No. 472,689

11 Claims. (Cl. 179—27)

This invention relates to telephone systems and has for one of its objects economy in the arrangement of trunk circuits.

More specifically it provides means whereby differently equipped operator positions in one building may have access to a distant office over the same trunk conductors.

In a growing toll telephone area, as additional and different tributary offices are put into service, additional operator positions are required at the main toll office and the type of equipment provided for such additional operator positions may very well differ from that provided at an earlier time. Therefore, the outgoing trunk circuits provided at the different types of positions will also differ. Where the outgoing traffic between the main office and a particular tributary office is quite small, these differences in the outgoing trunk circuits may result in inefficient use of the trunk conductors connecting the main office with that tributary office.

In accordance with the present invention, means is provided to permit the use of the same pair of trunk conductors by a trunk circuit at each of a plurality of operator positions.

A feature of the invention lies in means responsive to the seizure of the trunk circuit at one operator position for rendering the trunk conductors individual to that trunk circuit. The means for rendering the trunk conductors individual to one of the trunk circuits using the trunk conductors in common is also effective to mark the other trunk circuit or circuits busy.

In addition, means is provided to render ineffective an attempt to seize one trunk circuit when the trunk conductors have been individualized to another trunk circuit.

Where the tributary office includes automatic switching equipment, common control circuits, such as incoming senders or registers, are provided and the trunk circuits have access in common to such control circuits and each trunk circuit has means responsive to the same start dial signal from the control circuit to operate the proper start dial signal at the associated operator position.

These and other features of the invention will be more clearly understood from a consideration of the following description read in connection with the drawings in which.

Figure 1:
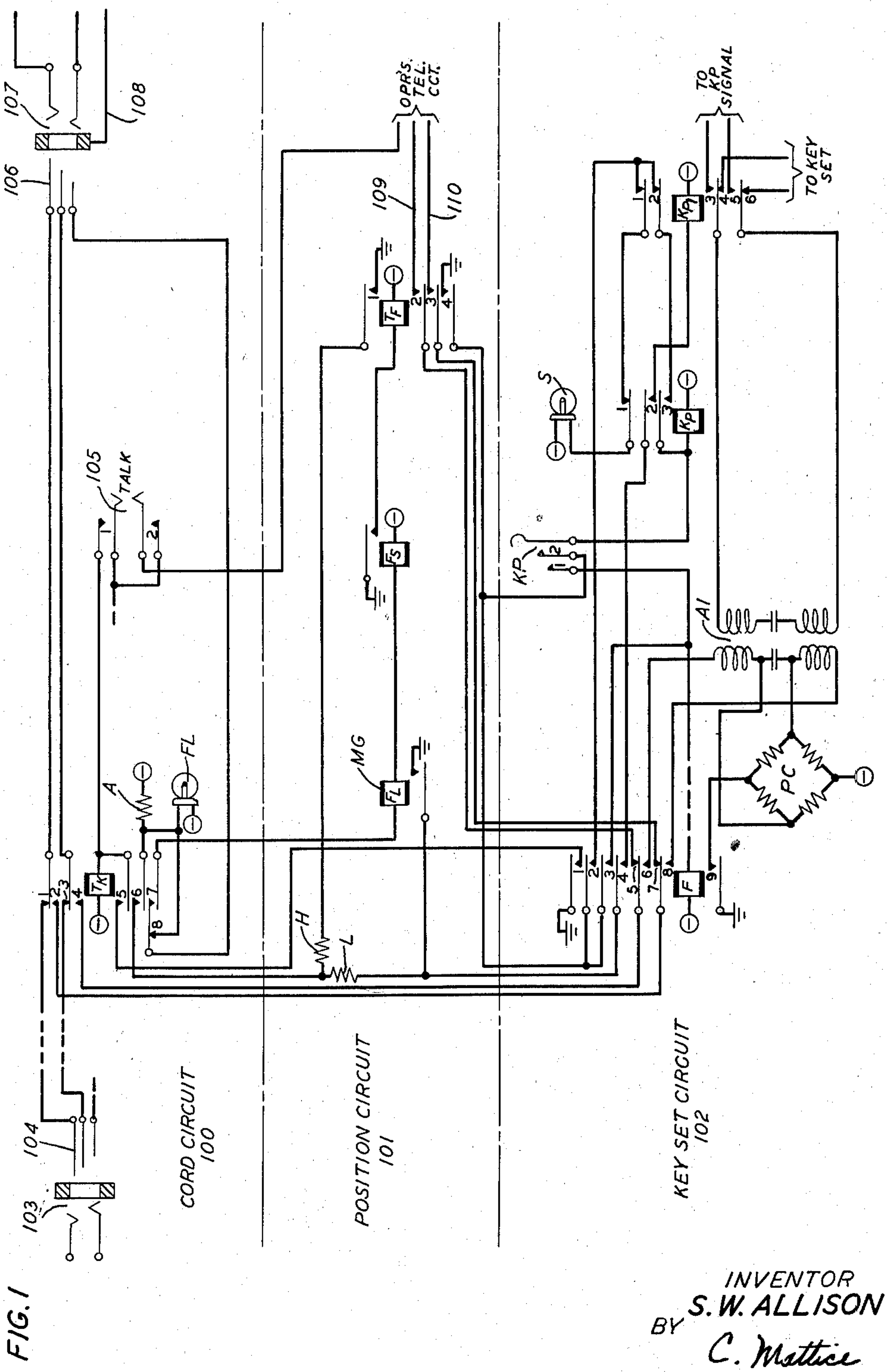
Fig. 1 shows a part of one cord circuit, the position circuit and the key set circuit at one type of operator position.

In the drawings, functional designations have been used for the various pieces of equipment and, since the same designations appear in different figures, in the accompanying description the particular piece of equipment referred to is indicated by adding the number of the figure set off by parentheses. Only such of the equipment at the operator positions has been shown as is necessary for an understanding of the present invention. For a complete showing of similar operator positions reference may be made to Patent 2,209,777, granted to King and Miller, July 30, 1940.

Figure 3:
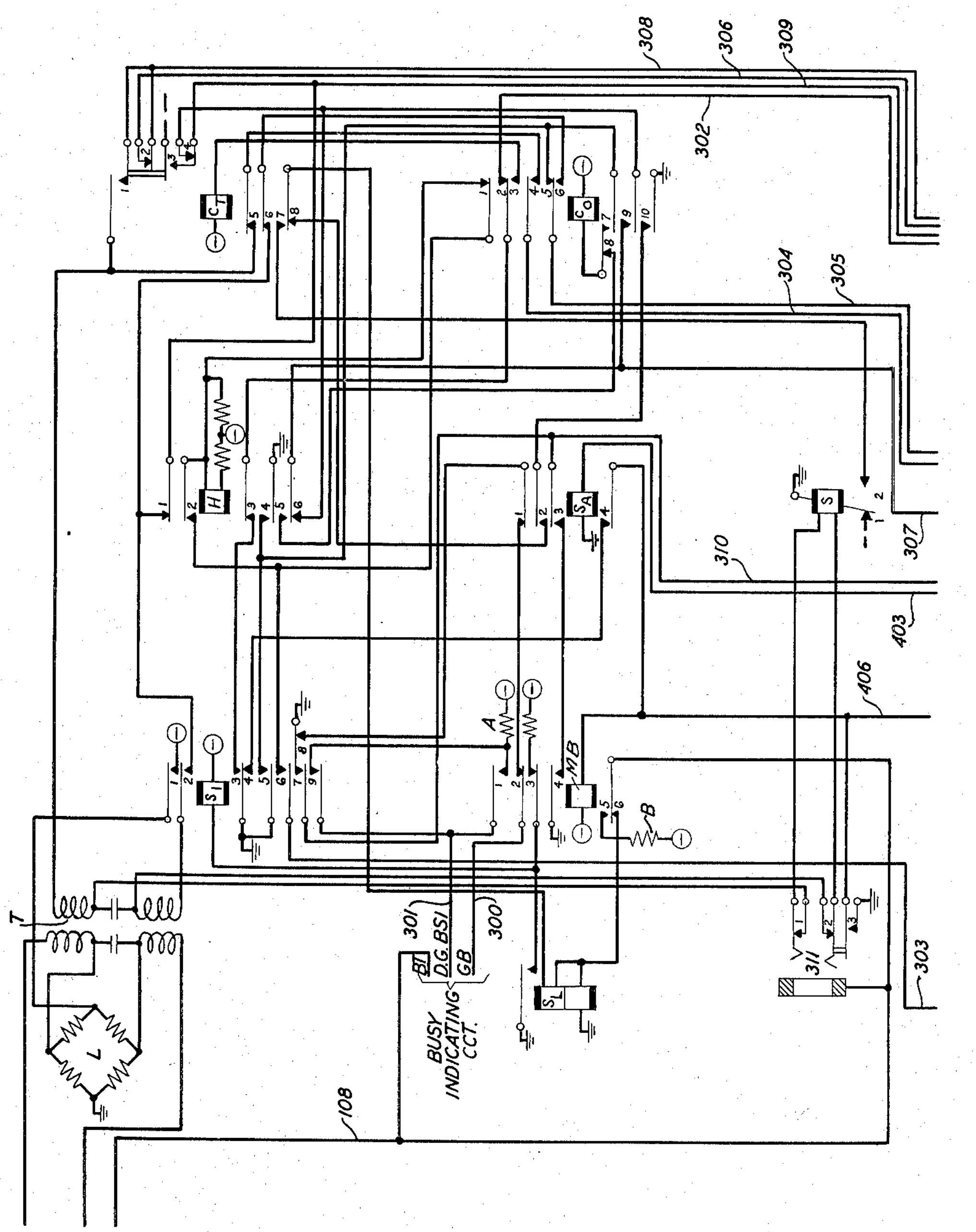
Fig. 3 shows a trunk circuit appearing at the position of Fig. 1.

The trunk conductors 400 and 401 are normally extended to the trunk circuit of Fig. 3 and therefore the operation of that trunk circuit will first be described.

No attempt will be made to trace the incoming part of the call. It will be sufficient to state that the call appears on a jack such as jack 103 and that the operator answers the call by inserting the plug 104 of a cord circuit 100 at her position in the jack 103. Talk key 105 will be operated, in turn operating relay TK(1). When the operator learns the designation of the wanted line she will insert the calling plug 106 of the cord 100 in the jack of a trunk leading to the office at which the called line is located, such as jack 107. With relay TK(1) operated, battery through the windings of relays FS(1) and FL(1) in the position circuit 101 is connected over contact 7 of relay TK(1) to the sleeve of plug 106 and thence over the sleeve of jack 107, conductor 108, contact 6 of relay MB(3) to ground through the high resistance lower winding of relay SL(3). Relays FS(1) and SL(3) operate in this circuit. Relay FL(1) is marginal and cannot operate in series with the high resistance winding of relay SL(3).

In the position circuit, relay FS(1) closes an obvious circuit for relay TF(1) which connects the operator's talking circuit over conductors 109 and 110, contacts 2 and 3 of relay TF(1), contacts 5 and 7 of relay F(1) in the key set circuit 102, contacts 2 and 4 of relay TK(1) to the tip and ring of plug 106. As its contact 1 relay TF(1) connects ground through high resistance H(1), contact 6 of relay TK(1) in parallel through resistor A(1) and lamp FL(1) to battery. The resistance of resistor A(1) is such that lamp FL(1) is not lighted at this time.

The operator, in order to complete the connection, operates and releases key KP(1) in the key set 102 to prepare for pulsing the designation. With the key KP(1) operated, a circuit is closed from ground over contact 4 of relay TF(1), contact 1 of key KP(1) to battery through the winding of relay F(1) and over contact 2 of key KP(1), to battery through the winding of relay KP(1). Relays F(1) and KP(1) operate in these circuits. Relay F(1) locks under the control of the start key (not shown) over contact 3 of relay F(1) to ground at contact 4 of relay TF(1), thereby remaining operated after key KP(1) is released. Relay KP(1) locks over its contact 3, contact 2 of relay KP1(1), contact 2 of relay F(1) to ground at contact 4 of relay TF(1). At its contacts 5 and 7, relay F(1) disconnects the tip and ring conductors of the cord circuit 100 from the operator's telephone circuit and extends them at contacts 6 and 8 to the left windings of the repeating coil A1(1). At its contact 9, relay F(1) connects ground to the pad control network PC(1) which is inserted between the left windings of repeating coil A1(1). The right winding of repeating coil A1(1) is normally connected over contacts 4 and 6 of relay KP1(1) to the key set.

In the trunk circuit, relay SL(3), in operating, closes a circuit for relay S1(3). Relay S1(3) operates and connects battery over its contact 1 to the pad control network L(3) which is connected to the left windings of repeating coil T(3). At its contact 8, relay S1(3) disconnects ground from the group busy lead 300 and at its contact 9 connects battery through resistor A(3) to conductor 301 to provide a visual indication that the trunk is busy.

Figure 4:
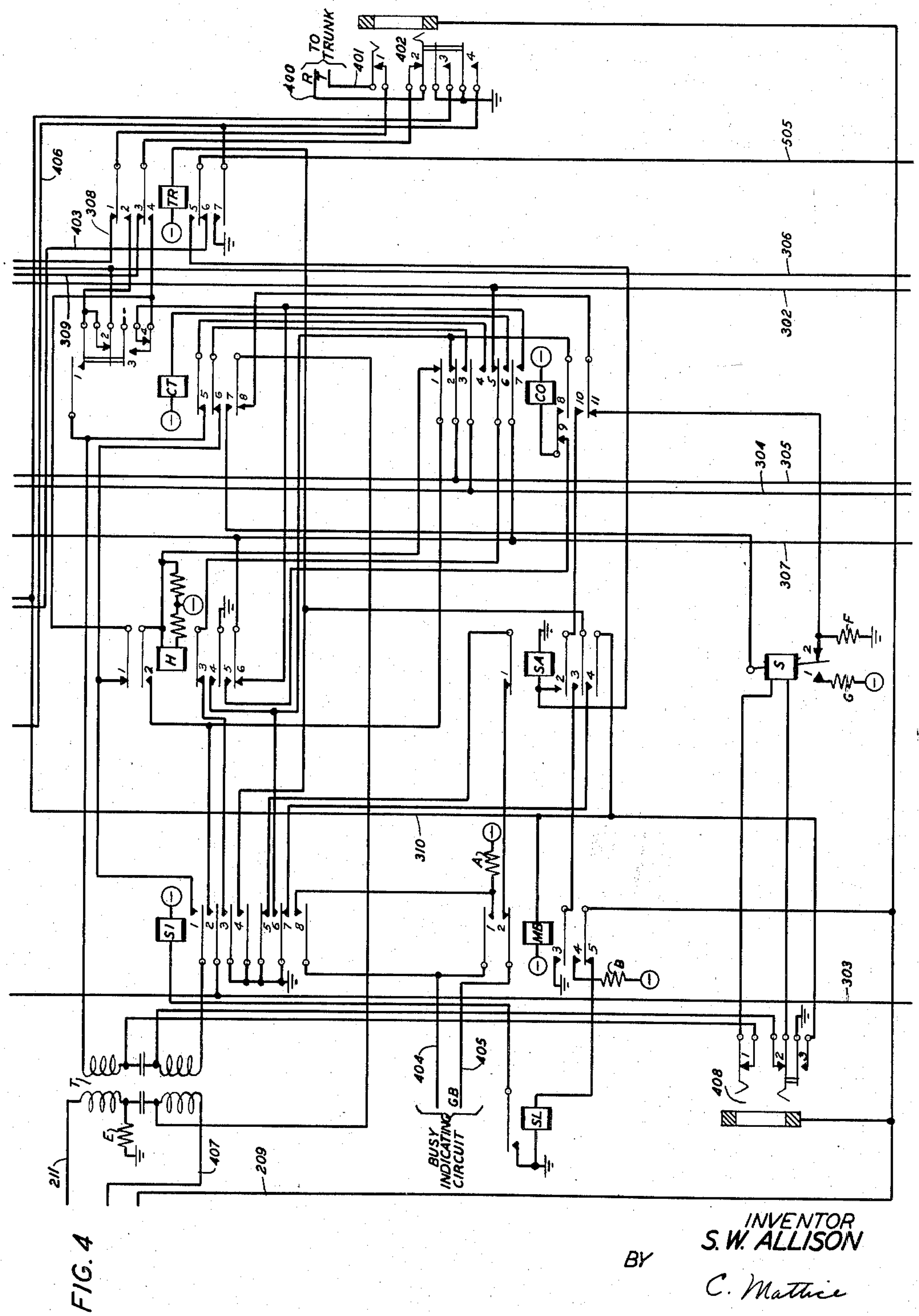
Fig. 4 shows a trunk circuit appearing at the position of Fig. 2.

Relay S1(3), in operating, connects ground over its contact 7 to conductor 310 which extends to the companion trunk circuit of Fig. 4 where it is connected to battery through the winding of the make-busy relay MB(4) operating that relay. Relay MB(4), at its contact 4, connects battery through resistor B(4) to the sleeve of jack 208 to mark the companion trunk busy at the position of Fig. 2. Relay MB(4) also opens the circuit of relay SL(4) so that, even though the operator of Fig. 2 should disregard the busy indication and insert a plug in jack 208, no operation of the trunk of Fig. 4 can take place as long as the trunk of Fig. 3 is in use.

Figures 5, 6:
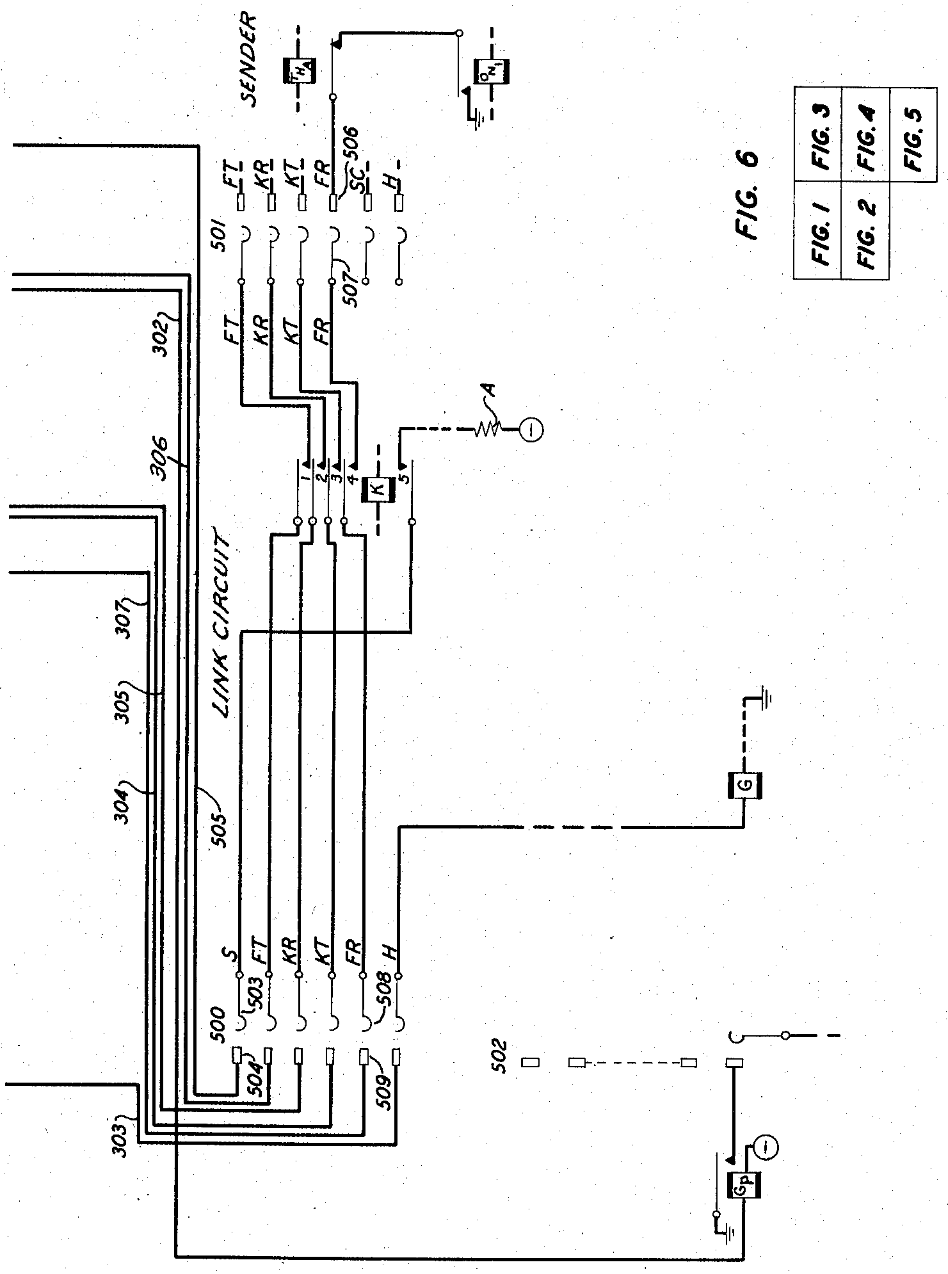
Fig. 5 shows a portion of the sender link for connecting the trunk circuits with an incoming sender.
Fig. 6 shows the manner in which Figs. 1 to 5 should be arranged.

Relay S1(3) also closes a circuit from ground over its contact 3, contact 3 of relay H(3), contact 2 of relay CO(3) to start conductor 302 leading to the sender link circuit of Fig. 5.

The sender link circuit of Fig. 5 is substantially like that disclosed in Patent 1,916,760, granted to I. H. Henry, July 4, 1933, and comprises a trunk finder 500 and sender selector 501. Ground on start conductor 302 operates group relay GP(5) which marks the corresponding contact in the group commutator 502 and initiates the operation of the trunk finder 500 and of the sender selector 501. The trunk finder is advanced to the level marked by relay GP(5) and is then rotated in search of the calling trunk. Relay S1(3), in operating, prepares a circuit from battery through the winding of relay H(3), contact 1 of relay CO(3), contact 6 of relay S1(3), to conductor 303 to mark the terminal set individual to this trunk in the trunk finder. When the trunk finder 500 is positioned on this terminal set, ground through the winding of relay G(5) is connected to conductor 303 and relays H(3) and G(5) operate. Relay G(5) stops the trunk finder and controls the further operation of the link circuit. Relay H(3), in operating, locks over its contact 2 and contact 6 of relay S1(3) to ground on conductor 303, independent of relay CO(3). With relay H(3) operated, ground is removed from the start circuit for the link.

When the sender finder 501 in the link circuit has found an idle sender, relay K(5) operates and connects battery through resistor A(5) over its contact 5, brush 503 and terminal 504 of trunk finder 500, conductor 505, contact 6 of the transfer relay TR(4) in the trunk circuit of Fig. 4, conductor 403, winding of relay SA(3) to ground. Relay K(5) also connects conductors 304 to 307 of the trunk circuit through to corresponding conductors of the selected sender. It may be noted that conductors 304 to 307 also extend to the trunk circuit of Fig. 4.

When the sender is ready to receive pulses, it operates off-normal relay ON1(5) closing a circuit from ground over the front contact of relay ON1(5), back contact of relay THA(5) over terminal 506 and brush 507 of the sender selector 501, contact 4 of relay K(5), brush 508 and terminal 509 of the trunk finder 500, conductor 307, contact 5 of relay H(3), contact 8 and winding of relay CO(3) to battery. Relay CO(3) operates in this circuit and locks over its contact 7 to ground at contact 4 of relay H(3) and contact 5 of relay S1(3).

With relays CO(3) and SA(3) operated, a start dial signal is given to the operator by the closure of a circuit from ground over contact 10 of relay CO(3), contact 2 of relay SA(3), contact 8 of relay CT(3) through the upper low resistance winding of relay SL(3) and thence, as previously traced, through the windings of the position circuit relays FL(1) and FS(1) to battery. The resistance in this circuit is low enough to permit marginal relay FL(1) to operate. Relay FL(1), in operating, connects ground through low resistance L(1) to lamp FL(1) lighting that lamp as a preliminary indication that the sender is attached.

With relay CO(3) operated, the upper right winding of repeating coil T(3) is extended over contact 5 of relay CT(3), contact 4 of relay CO(3) to conductor 304 and the lower right winding of repeating coil T(3) is extended over contact 2 of relay S1(3), contact 6 of relay CT(3), contact 6 of relay CO(3) to conductor 305 and thence to the sender.

Relay FL(1) also closes a circuit from ground over its contact, contact 4 of relay F(1), contact 2 of relay KP(1) to battery through the winding of relay KP1(1). Relay KP1(1) operates and disconnects the right windings of repeating coil A1(1) from the key set and connects this to a source for the preliminary key pulse signal. Relay KP1(1) also opens the locking circuit of relay KP(1) so that relay KP(1) releases. Relays KP(1), in releasing, opens the circuit of relay KP1(1) which releases, restoring the connection between the repeating coil A(1) and the key set. With relay KP(1) and relay KP1(1) released, a circuit is closed from ground over contact 4 of relay TF(1), contact 2 of relay F(1), contact 1 of relay KP1(1), contact 1 of relay KP(1) through lamp S(1) to battery. Lamp S(1) lights to indicate to the operator that the key pulse signal has been sent and that she may start to operate her key set. Multi-frequency pulses are transmitted from the key set over contacts 6 and 4 of relay KP1(1) through the repeating coil A1(1), contacts 8 and 6 of relay F(1), contacts 2 and 4 of relay TK(1), tip and ring of plug 106 and jack 107, repeating coil T(3), contact 2 of relay S1(3), contacts 5 and 6 of relay CT(3), contacts 4 and 6 of relay CO(3), conductors 304 and 305 to the sender.

After the operator has completed keying the digits of the designation, she will operate a start key (not shown) which transmits a start signal to the sender and opens the locking circuit of relay F(1) permitting the key set circuit 102 to restore to normal. The operator may restore her talking key while she is operating her key set or immediately thereafter. The restoration of key 105 opens the operating circuit of relay TK(1) but, if the operator has not finished operating her key set, relay TK(1) is held operated over its contact 5 and contact 1 of relay F(1) until relay F(1) releases. When relay TK(1) releases, it connects the tip and ring of plug 106 through equipment (not shown) to the tip and ring of plug 104 completing a talking circuit through cord 100. With relay TK(1) released, the sleeve of plug 106 is connected over contact 8 of relay TK(1) to lamp FL(1) which remains lighted under the control of relays SA(3) and CO(3). Relays FL(1) and FS(1) release, in turn releasing relay TF(1) which disconnect the operator's telephone circuit from the cord 100.

Having received the wanted designation by means of the multifrequency pulses generated at the operator's key set, the sender will transmit the designation to the distant office over conductors 306 and 307. Conductor 306 extends over contact 2 of relay CT(3), conductor 308, contact 1 of relay TR(4), contact 1 of jack 402 to conductor 401 while conductor 307 extends over contact 9 of relay CO(3), contact 4 of relay CT(3), conductor 309, contact 3 of relay TR(4), contact 2 of jack 402 to conductor 400.

When the sender has completed its functions, it causes the link to remove ground from conductor 303 to cause the trunk circuit to cut through. Removal of ground from conductor 303, causes relay H(3) to release as well as the link circuit and sender. The release of relay H(3) closes a circuit from ground over contact 3 of relay S1(3), contact 3 of relay H(3), contact 3 of relay CO(3) to battery through the winding of cut-through relay CT(3). With relay CT(3) operated, the right windings of repeating coil T(3) are disconnected from conductors 304 and 305. The upper right winding of repeating coil T(3) is connected over contact 1 of relay CT(3) to conductor 308 and thence to the outgoing trunk conductor 401. The lower right winding of repeating coil T(3)

is connected over contact 2 of relay S1(3) and contact 1 of relay H(3) to conductor 309 and thence to outgoing trunk conductor 400. The winding of supervisory relay S(3) is connected over contacts 1 and 2 of jack 311 to the inner terminals of the right windings of repeating coil T(3) and that relay operates over the trunk conductors from battery and ground supplied by the distant office. With relays S(3) and CT(3) operated, ground is connected over contact 2 of relay S(3) and contact 7 of relay CT(3) to the upper winding of relay SL(3) to maintain lamp FL(1) lighted.

When the called subscriber answers, the connection of battery and ground to the trunk conductors 400 and 401 at the distant office is reversed and relay S(3) releases opening the circuit through the upper winding of relay SL(3) and extinguishing lamp FL(1). When the called subscriber hangs up, the connection of battery and ground is restored and relay S(3) reoperates, in turn relighting lamp FL(1) as a disconnecct signal.

When the operator withdraws plug 106 from jack 107, relay SL(3) releases, in turn releasing relay S1(3), relay CO(3) and relay CT(3), restoring the trunk circuit to normal. The release of relay S1(3) disconnects ground from conductor 310 to release relay MB(4) and render the trunk circuit of Fig. 4 idle.

Figure 2:
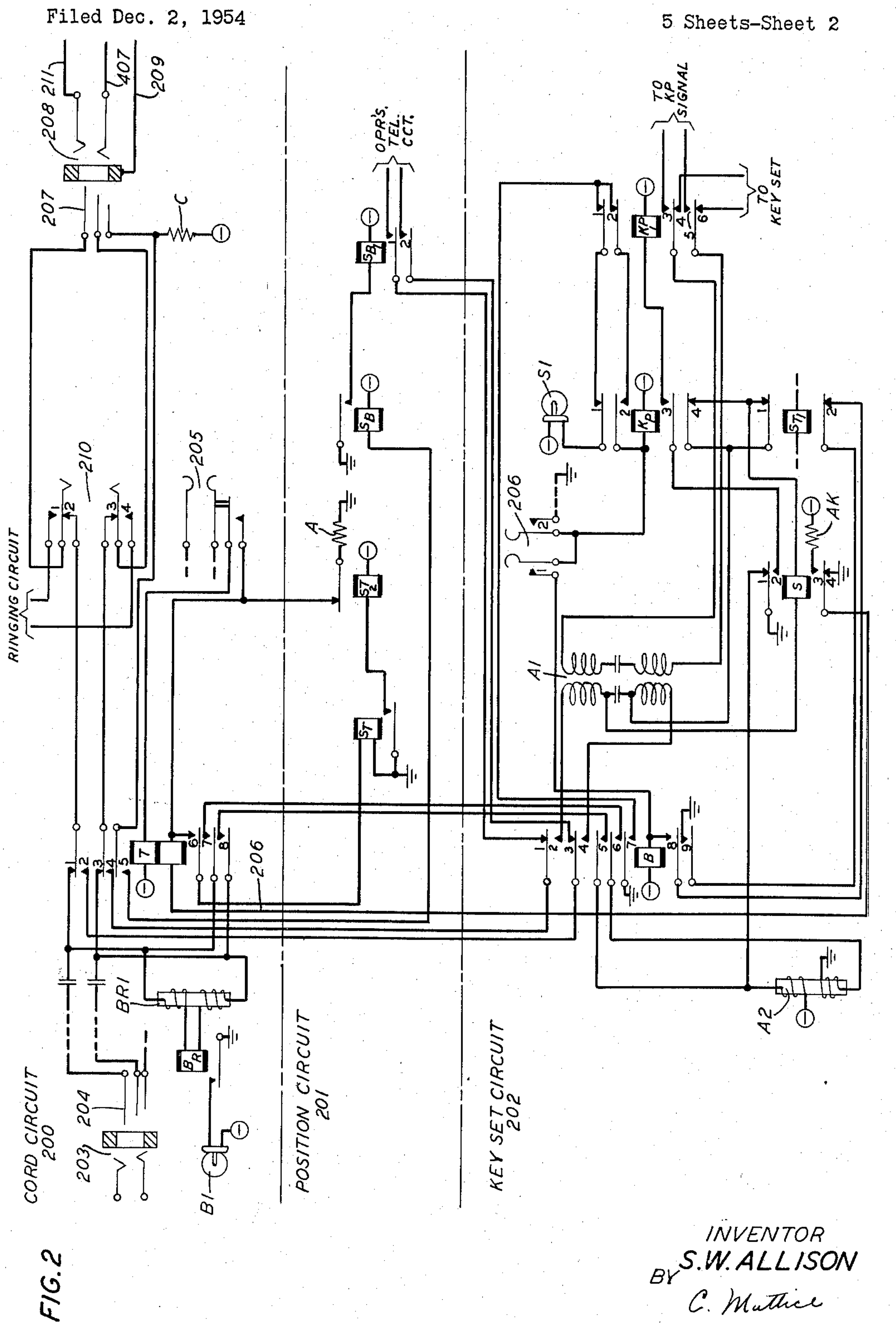
Fig. 2 shows a part of one cord circuit, the position circuit and the key set circuit at a different type of operator position.

If a call to the same office, as assumed above, is originated at a distant office having access to the operator position of Fig. 2, it will appear at jack 203 and will be answered by inserting the plug 204 of a cord circuit such as cord circuit 200 in jack 203. As in the former case, no attempt has been made to show the answering end of the cord circuit but the operator will operate her talking key 205, closing a circuit from battery through the winding of relay T(2), contact of key 205, back contact of relay ST2(2) in the position circuit 201 to ground through resistance A(2). Relay T(2) operates in this circuit and locks in a circuit from battery through its upper winding, contact of key 205, contact 6 of relay T(2), winding of relay ST(2) to ground. Relay ST(2) operates in this circuit, in turn operating relay ST2(2) which disconnects ground through resistance A(2) from key 205 and the talking keys of other cord circuits.

In order to prepare for transmitting the designation, the operator will also briefly operate key pulsing key 206 in the key set circuit 202. The operation of key 206 closes a circuit from ground over contacts 2 and 1 of key 206 to battery through the winding of relay B(2). Relay B(2) operates and locks over its contact 8, contact 2 of relay ST1(2) to ground at contact 9 of relay B(2) thereby remaining operated after key 206 is released. A circuit is also closed from ground over contact 2 of key 206 to battery through the winding of relay KP(2). Relay KP(2) operates and locks over its contact 2 and contact 2 of relay KP1(2) to ground over contact 7 of relay B(2).

Having received the designation of the wanted subscriber and assuming that it requires the use of a trunk circuit such as that shown in Fig. 4, the operator will insert the calling plug 207 of cord 200 in jack 208 leading to that trunk circuit. The sleeve of plug 207 is connected to battery through resistance C(2) and also, with relay T(2) operated, over contact 5 of relay T(2) to battery through the winding of relay SB(2). When the operator inserts plug 207 in jack 208, a circuit is completed from battery connected to the sleeve of plug, as above traced, sleeve of jack 208, conductor 209, contact 5 of relay MB(4), winding of relay SL(4) to ground. Relay SL(4) operates in this circuit and connects ground to the winding of relay S1(4) and battery, operating the latter relay. Relay SB(2) also operates, in turn operating relay SB1(2).

Relay S1(4) at its contact 8 connects battery through resistance A(4) to conductor 404 and at its contact 5 disconnects ground from conductor 405 to operate equipment at the busy indicating circuit. At its contact 4 relay S1 (4) connects ground to the winding of relay TR(4) and battery, operating relay TR(4) to disconnect the outgoing trunk conductors 400 and 401 from the trunk circuit of Fig. 3 and connect them with the trunk circuit of Fig. 4, thereby individualizing trunk conductors 400 and 401 to the latter trunk circuit. At its contact 7 relay TR(4) connects ground to conductor 406 operating relay MB(3) in the trunk circuit of Fig. 3. Relay MB(3) at its contact 5 connects battery through resistor B(3) to conductor 108 and the sleeve of jack 107 to mark the trunk circuit of Fig. 3 busy and at its contact 6 opens the circuit of relay SL(3) so that the accidental insertion of a plug in jack 107 will not initiate the operation of the trunk circuit of Fig. 3.

Relay S1(4) closes a circuit from ground over its contact 3, contact 3 of relay H(4), contact 5 of relay CO(4) and start conductor 302 to the winding of group relay GP(5) in the link circuit. It will be noted that this is the same start conductor and the same group relay operated by the seizure of the trunk of Fig. 3.

As previously described, relay GP(5) initiates the operation of the trunk finder 500 and the sender selector 501. With relay S1(4) operated, battery through the winding of relay H(4) is connected over contact 1 of relay CO(4) and contact 2 of relay S1(4) to conductor 303 so that, when the trunk finder 500 has found the trunk circuit of Fig. 4 relay H(4) is operated in series with the winding of relay G(5) and ground. Relay H(4), in operating, locks over its contact 2 and contact 2 of relay S1(4) to conductor 303. At its contact 3, relay H(4) opens the link start circuit. When a sender has been found, relay K(5) operates to extend conductors 304 to 307 to the sender and closes a circuit from battery through resistance A(5), contact 5 of relay K(5), brush 503, terminal 504, conductor 505, contact 5 of relay TR(4) to ground through the winding of relay SA(4) operating the latter relay. When the sender is ready to receive pulses, it operates its off-normal relay ON1(5) completing a circuit from ground over the contact of relay ON1(5), a back contact of relay THA(5), terminal 506 and brush 507 of the sender selector 501 contact 4 of relay K(5), brush 508 and terminal 509 of the trunk finder 500, conductor 307, contact 5 of relay H(4), contact 9 and winding of relay CO(4) to battery.

Relay CO(4) operates in this circuit and locks over its contact 8 to ground at contact 6 of relay S1(4) and contact 4 of relay H(4). As soon as relay CO(4) operates, the upper right winding of repeating coil T(4) is connected over contact 5 of relay CT(4) and contact 4 of relay CO(4) to conductor 304 while the lower right winding of repeating coil T(4) is extended over contact 1 of relay S1(4), contact 6 of relay CT(4), contact 3 of relay CO(4) to conductor 305, these conductors extending through the link circuit to the sender and the receiving equipment in that circuit. With relay CO(4) operated, the battery connected to conductor 505 to operate relay SA(4) is extended over contact 2 of relay SA(4), contact 10 of relay CO(4), contact 8 of relay CT(4), lower left winding of repeating coil T(4), conductor 407, ring of jack 208 and plug 207, contact 3 or ringing key 210, contact 4 or relay T(2), contact 2 of relay B(2), upper left winding of repeating coil A1(2), winding of relay S(2), contact of relay ST1(2), lower left winding of repeating coil A1(2), contact 4 of relay B(2), contact 2 of relay T(2), contact 2 of ringing key 210, tip of plug 207 and jack 208, conductor 211, upper left winding of repeating coil T(4) to ground through resistor E(4). Relay S(2) operates in this circuit. With relays T(2) and B(2) operated, a circuit is closed from battery through the upper winding of retard coil A2(2), contact 5 of relay B(2), contact 8 of relay T(2), lower winding of retard coil BR1(2), winding or relay BR(2), upper winding of retard coil BR1(2), contact 7 of relay T(2), contact 6 of relay B(2), to ground through the lower winding of retard coil A2(2). However, as long as relay S(2) is not operated ground is connected over contact 1 of relay S(2) to battery through the upper winding of retard coil A2(2) shunting the winding of relay BR(2) to prevent its operation. When relay S(2) operates, as above described, it removes the shunt from the winding of relay BR(2) and that relay operates, lighting lamp B1(2) as a signal to the operator to prepare for operating her key set. In addition, relay S(2) connects battery through resistor AK(2) over its contact 3 to the lower winding of relay T(2) to provide a locking circuit for relay T(2) independent of the talk key 205 until keying has been completed.

Relay S(2), in operating, also closes a circuit from ground over its contact 2 and contact 3 of relay KP(2) to battery through the winding of relay KP1(2). Relay KP1(2) operates, disconnecting the right windings of repeating coil A1(2) from the key set and connecting them to means for generating a preliminary key pulse signal. Relay KP1(2) opens the locking circuit of relay KP(2) causing that relay to release. Relay KP(2), in releasing, opens the circuit of relay KP1(2) and that relay releases, in turn terminating the key pulse signal. With relays KP(2) and KP1(2) released, a circuit is closed from ground over contact 7 of relay B(2), contact 1 of relay KP1(2), contact 1 of relay KP(2) to battery through lamp S(2) as a signal to the operator that the key pulse signal has been transmitted and that she may start to transmit the wanted designation.

After the operator has completed the operation of her key set, she will operate her start key (not shown) which operates relay ST1(2) after the start signal has been transmitted to the sender. Relay ST1(2), at its contact 2, opens the locking circuit for relay B(2) causing that relay to release and disconnect the key set circuit 202 from the cord circuit 200. The release of relay B(2) releases relay BR(2) which restores lamp B1(2). When the operator releases her talking key 205, if keying has been completed, relay T(2) releases and plug 207 is connected through equipment (not shown) to the plug 204 to complete the talking circuit through the cord 200. Key 210 permits the operator to transmit ringing current toward the called line if she needs to do so.

The multifrequency pulses from the key set pass over contacts 6 and 4 of relay KP1(2), through repeating coil A1(2), contacts 4 and 2 of relay B(2), contacts 2 and 4 of relay T(2), contacts 2 and 3 of ringing key 210, tip and ring of plug 207 and jack 208, conductors 211 and 407, through the repeating coil T(4), contact 1 of relay S1(4), contacts 5 and 6 of relay CT(4), contacts 4 and 3 of relay CO(4), conductors 304 and 305 and through the link circuit of Fig. 5 to the sender. When the sender has received the designation followed by the start signal, it transmits the designation to the distant office over conductors 306 and 307, which are extended over contact 7 of relay CO(4), contacts 2 and 4 of relay CT(4), contacts 2 and 4 of relay TR(4), contacts 1 and 2 of jack 402 to the outgoing conductors 401 and 400.

When the sender has completed its functions it signals the trunk to cut through by causing the link to disconnect ground from conductor 303 causing relay H(4) to release, as well as the link circuit and sender. With relay H(4) released, a circuit is closed from ground over contact 3 of relay S1(4), contact 3 of relay H(4), contact 6 of relay CO(4) to battery through the winding of cut-through relay CT(4). Relay CT(4) operates and disconnects the outgoing trunk conductors from conductors 306 and 307. It connects conductor 401 over contact 1 of jack 402, contact 2 of relay TR(4) contact 1 of relay CT(4), to the upper right winding of repeating coil T(4) and connects conductor 400 over contact 2 of jack 402, contact 4 of relay TR(4), contact 1 of relay H(4), contact 1 of relay S1(4) to the lower right winding of repeating coil T(4). The right windings of repeating coil T(4) are connected together over contacts 1 and 2 of jack 408 through the winding of relay S(4). Relay S(4) operates from battery and ground supplied by the distant office and connects battery through the resistor G(4) over contact 1 of relay S(4), contact 7 of relay CT(4), lower left winding of repeating coil T(4), conductor 407, ring of jack 208 and plug 207, contact 3 of key 210, contact 3 of relay T(2), lower winding of retard coil BR1(2), winding of relay BR(2), upper winding of retard coil BR1(2), contact 1 of relay T(2), contact 2 of key 210, tip of plug 207 and jack 208, conductor 211, upper left winding of repeating coil T(4) to ground through resistor E(4). Relay BR(2) operates and lights lamp B1(2). When the called subscriber answers the call, battery and ground to the trunk conductors is reversed and relay S(4) releases, connecting ground through resistor F(4) to conductor 407 causing relay BR(2) to release and extinguishing lamp B1(2).

At the end of the conversion, when the called subscriber hangs up his receiver, the connection of battery and ground to conductors 400 and 401 is again reversed so that relay S(4) reoperates, in turn operating relay BR(2) causing the cord supervisory lamp B1(2) to light.

When the operator withdraws plug 207 from jack 208, following the release signal from either the calling or the called line, relay SL(4) releases in turn releasing relay S1(4). Relay S1(4) in turn releases relays H(4), CT(4) and TR(4) restoring the trunk circuit to normal. The release of relay SL(4) followed by the release of relay TR(4) opens the circuit of relay S(4) causing that relay to release whether or not the called subscriber has restored his receiver. With relay TR(4) released, the talking conductors 400 and 401 are again connected to the trunk circuit of Fig. 3. In addition, the release of relay TR(4) disconnects ground from conductor 406 to release relay MB(3) and restore the trunk circuit of Fig. 3 to service.

While the specific embodiment above described concerns the use of only two trunks, it will be understood that the invention is not so limited.

What is claimed is:

1. In a telephone system, a first operator's position in one telephone building, cord circuits at said first position, a first trunk circuit appearing in a jack at said first position, other operator positions in the same telephone building, cord circuits at said other positions, other trunk circuits appearing in jacks at said other positions, a set of trunk conductors connecting said one telephone building with a distant office, and means for alternatively connecting said trunk conductors with said first trunk circuit or said other trunk circuits, responsive to the connection of one of said cord circuits with one of said jacks.

2. In a telephone system, a first operator's position in one telephone building, cord circuits at said first position, a first trunk circuit appearing in a jack at said first position, other operator positions in the same telephone building, cord circuits at said other positions, other trunk circuits appearing in jacks at said other positions, a set of trunk conductors connecting said one telephone building with a distant office, means for normally connecting said set of trunk conductors with said first trunk circuit, and means responsive to the insertion of a cord circuit in the jack of one of said other trunk circuits for disconnecting said trunk conductors from said first trunk circuit and connecting said set of trunk conductors to said one other trunk circuit.

3. In a telephone system, a first operator's position in one telephone building, cord circuits at said first position, a first trunk circuit appearing in a jack at said first position, other operator positions in the same telephone building, cord circuits at said other positions, other trunk circuits appearing in jacks at said other positions, a set of trunk conductors connecting said one telephone building with a distant office, means for normally connecting said set of trunk conductors with said first trunk circuit, means responsive to the insertion of a plug in the jack of said first trunk circuit for marking said other trunk circuits busy, means responsive to the insertion of a cord circuit in the jack of one of said other trunk circuits when said other trunk circuit is not marked busy for disconnecting said trunk conductors from said first trunk circuit and connecting said set of trunk conductors to said one other trunk circuit, and means also responsive to the insertion of said cord circuit in the jack of said one other trunk circuit for marking said first trunk circuit busy.

4. In a telephone system, a first operator's position in in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office and means for alternatively connecting said trunk conductors with said first trunk circuit or said other trunk circuit, responsive to the connection of one of said cord circuits with one of said jacks.

5. In a telephone system, a first operator's position in in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit and means responsive to the insertion of a cord circuit in the jack of said second trunk circuit for transferring said trunk conductors from said first trunk circuit to said second trunk circuit.

6. In a telephone system, a first operator's position in in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit and means responsive to the insertion of a cord circuit in the jack of said second trunk circuit for disconnecting said trunk conductors from said first trunk circuit and connecting said set of trunk conductors to said trunk circuit.

7. In a telephone system, a first operator's position in in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit, means responsive to the insertion of a plug in the jack of said first trunk circuit for marking said second trunk circuit busy, means responsive to the insertion of a cord circuit in the jack of said second trunk circuit when said second trunk circuit is not marked busy for disconnecting said trunk conductors from said first trunk circuit and connecting said set of trunk conductors to said second trunk circuit, and means also responsive to the insertion of said cord circuit in the jack of said second trunk circuit for marking said first trunk circuit busy.

8. In a telephone system, a first operator's position in in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit, means responsive to the insertion of a plug in the jack of said first trunk circuit for marking said second trunk circuit busy, means responsive to the insertion of a cord circuit in the jack of said second trunk circuit when said second trunk circuit is not marked busy for disconnecting said trunk conductors from said first trunk circuit and connecting said set of trunk conductors to said second trunk circuit, means also responsive to the insertion of said cord circuit in the jack of said second trunk circuit for marking said first trunk circuit busy and means also responsive to the insertion of said cord circuit in the jack of said first trunk circuit to render ineffective said means responsive to the insertion of a cord circuit in the jack of said second trunk circuit.

9. In a telephone system, a first operator's position in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit, means responsive to the insertion of a cord circuit in the jack of said second trunk circuit for transferring said trunk conductors from said first trunk circuit to said second trunk circuit, a control circuit, a link circuit for connecting trunk circuits with said control ciruit and a set of onductors connecting said link circuit to said first trunk circuit and to said second trunk circuit in multiple.

10. In a telephone system, a first operator's position in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit, means responsive to the insertion of a cord circuit in the jack of said second trunk circuit for transferring said trunk conductors from said first trunk circuit to said second trunk circuit, a control circuit, a link circuit for connecting trunk circuits with said control circuit, a set of conductors connecting said link circuit to said first trunk circuit and to said second trunk circuit in multiple, a first start pulsing signal in said first operator's position, a second start pulsing signal in said second operator's position, first relay means in said first trunk circuit to operate said first start pulsing signal, second relay means in said second trunk circuit to operate said second start pulsing signal, an auxiliary conductor connecting said link circuit with said first trunk circuit, means in said control circuit for connecting a start pulsing indication to said auxiliary conductor and means for alternatively connecting said auxiliary conductor to said first relay means or to said second relay means.

11. In a telephone system, a first operator's position in one telephone building, cord circuits at said first position, a first trunk circuit appearing in a jack at said first position, a second operator's position in the same telephone building, cord circuits at said second position, a second trunk circuit appearing in a jack at said second position, a set of trunk conductors connecting said one telephone building with a distant office, means for normally connecting said set of trunk conductors with said first trunk circuit, means responsive to the insertion of a cord circuit in the jack of said second trunk circuit for transferring said trunk conductors from said first trunk circuit to said second trunk circuit, a control circuit, a link circuit for connecting trunk circuits with said control circuit, a set of conductors connecting said link circuit to said first trunk circuit and to said second trunk circuit in multiple, a first start pulsing signal in said first operator's position, a second start pulsing signal in said second operator's position, first relay means in said first trunk circuit to operate said first start pulsing signal, second relay means in said second trunk circuit to operate said second part pulsing signal, an auxiliary conductor connecting said link circuit with said first trunk circuit, and means in said control circuit for normally operating said first relay means, said trunk conductor transfer means also effective to transfer said auxiliary conductor from said first trunk circuit to said second trunk circuit to cause the operation of said second relay means.

References Cited in the file of this patent

UNITED STATES PATENTS

| | | |
|---|---|---|
| 2,162,892 | Koechling | June 20, 1939 |
| 2,186,219 | Toomey | Jan. 9, 1940 |
| 2,621,258 | Balzer | Dec. 8, 1952 |
| 2,718,558 | Diesen et al. | Sept. 20, 1955 |